(12) United States Patent
Varanasi et al.

(10) Patent No.: US 11,207,592 B2
(45) Date of Patent: Dec. 28, 2021

(54) 3D IMMERSIVE METHOD AND DEVICE FOR A USER IN A VIRTUAL 3D SCENE

(71) Applicant: INTERDIGITAL CE PATENT HOLDINGS, Paris (FR)

(72) Inventors: Kiran Varanasi, Saarbruecken (DE); Quang Khanh Ngoc Duong, Rennes (FR); Julien Fleureau, Rennes (FR); Philippe Robert, Rennes (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 16/465,268

(22) PCT Filed: Nov. 16, 2017

(86) PCT No.: PCT/EP2017/079435
§ 371 (c)(1),
(2) Date: May 30, 2019

(87) PCT Pub. No.: WO2018/099726
PCT Pub. Date: Jun. 7, 2018

(65) Prior Publication Data
US 2019/0344167 A1    Nov. 14, 2019

(30) Foreign Application Priority Data
Nov. 30, 2016  (EP) .................................... 16306581

(51) Int. Cl.
*A63F 9/24*   (2006.01)
*A63F 11/00*  (2006.01)
(Continued)

(52) U.S. Cl.
CPC ............ *A63F 13/25* (2014.09); *A63F 13/211* (2014.09); *A63F 13/212* (2014.09); *A63F 13/5255* (2014.09); *A63F 13/537* (2014.09)

(58) Field of Classification Search
USPC .................. 463/1, 10, 20, 22, 25, 30, 32, 39
See application file for complete search history.

(56) References Cited

U.S. PATENT DOCUMENTS

| 5,680,524 A | 10/1997 | Maples et al. |
| 6,362,817 B1 | 3/2002 | Powers et al. |

(Continued)

FOREIGN PATENT DOCUMENTS

WO    2011149558 A2    12/2011

OTHER PUBLICATIONS

Bowman, D., et al, "Travel in immersive virtual environments: An evaluation of viewpoint motion control techniques" In Proceedings of IEEE 1997 Annual International Symposium on Virtual Reality pp. 45-52 (1997).

(Continued)

*Primary Examiner* — Adetokunbo O Torimiro
(74) *Attorney, Agent, or Firm* — Invention Mine LLC

(57) ABSTRACT

A position and an orientation of a user in a virtual 3D scene is determined (22), an action is executed (24) in the virtual 3D scene for the user in function of the position and orientation of the user with respect to a given place, and a result of the action is outputted (25). For at least one event in the scene consisting in a presence of at least one determined virtual content, metadata linking the event(s) and at least one place of the event(s) are obtained (21). A given event and the given place linked by those metadata are determined (241), in function of the above position and orientation and of a relationship between that event and a user profile of the user. The action regarding the determined given event and place is executed.

17 Claims, 2 Drawing Sheets

Figure 1:
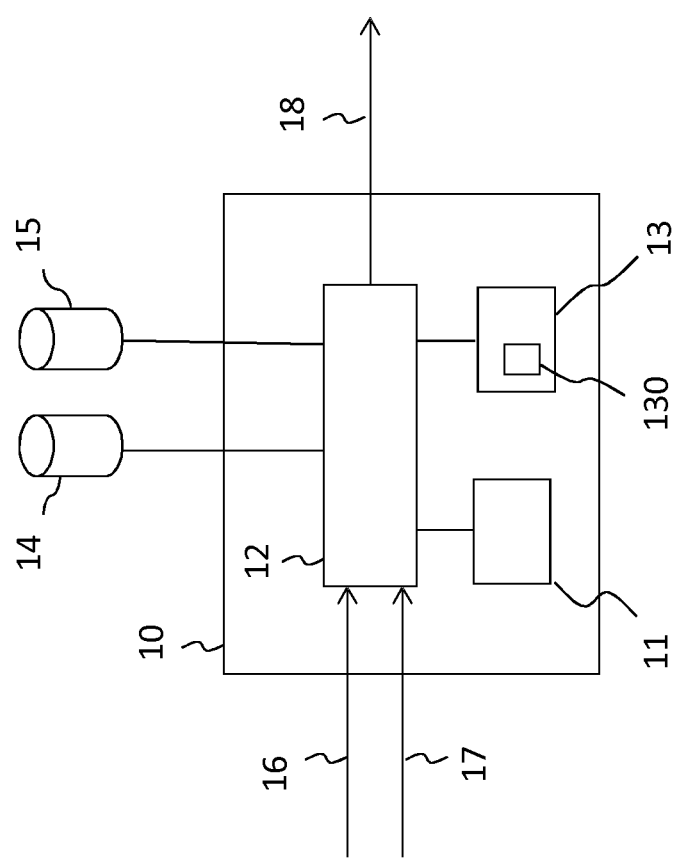

(51) Int. Cl.
*G06F 13/00* (2006.01)
*G06F 17/00* (2019.01)
*A63F 13/25* (2014.01)
*A63F 13/211* (2014.01)
*A63F 13/212* (2014.01)
*A63F 13/5255* (2014.01)
*A63F 13/537* (2014.01)

(56) References Cited

U.S. PATENT DOCUMENTS

| 7,068,274 B2 | 6/2006 | Welch et al. |
| 9,392,212 B1 * | 7/2016 | Ross ............... H04N 5/9305 |
| 2016/0191893 A1 | 6/2016 | Gewickey et al. |

OTHER PUBLICATIONS

Ha, H., et al, "An interactive interface for lighting-by-example." In International Symposium on Smart Graphics, pp. 244-252. Springer, Berlin, Heidelberg, (2010).

Jacobson, D. et al, "Chapter 25 Multimodal virtual reality for presenting geographic information" Submission to Virtual Reality in Geography' edited by Peter Fisher and David Unwin (2002).

Spence, A., et al, "Real-time per-pixel rendering of textiles for virtual textile catalogues" International Journal of Clothing Science and Technology. vol. 16 pp. 51-62. (2004) 10.1108/09556220410520351.

Wang, O., et al "A context-aware light source" 2010 IEEE International Conference on Computational Photography, ICCP 2010. (2010) 10.1109/ICCPHOT.2010.5585091.

Ridel, B., et al, "The Revealing Flashlight: Interactive spatial augmented reality for detail exploration of cultural heritage artifacts" Journal on Computing and Cultural Heritage, Association for Computing Machinery, vol. 7 No. 2 article 1 (2014).

Vosinakis, S., et al, "Virtual Worlds as Information Spaces: Supporting Semantic and Social Navigation in a shared 3D Environment" 2011 Third International Conference on Games and Virtual Worlds for Serious Applications pp. 220-227 (2011).

Elcacho, C., et al, "Object-Centered Navigation in Virtual Construction Applications" Department of Animation and Image Communication Fraunhofer Institute for Computer Graphics (2001).

* cited by examiner

3D IMMERSIVE METHOD AND DEVICE FOR A USER IN A VIRTUAL 3D SCENE

This application claims the benefit under 35 U.S.C. § 365 of International Application PCT/EP2017/079435, filed Nov. 16, 2017, which was published in accordance with PCT Article 21(2) on Jun. 7, 2018, in English, and which claims the benefit of European patent application No. 16306581.6 filed Nov. 30, 2016.

1. TECHNICAL FIELD

The present invention relates to the field of virtual reality (VR). More specifically, the present invention relates to a 3D immersive solution (method and device) for a user in a virtual 3D scene.

2. TECHNOLOGICAL BACKGROUND

Immersive head mounted displays (HMDs), such as Oculus Rift™ or HTC Vive™, can be used for rendering a 3D scene in virtual reality, that covers not only the foveal vision but also the peripheral vision. This enables the user to experience a feeling of presence in the virtual scene that engages many sensory modalities.

In the real world, users navigate by walking or driving a vehicle. They are subject to physical laws like gravity and friction, as well as constraints such as obstacles and barriers. Further, even after a person knows a priori where to go to, it takes an amount of time and physical energy to arrive at the destination.

In virtual reality, it is possible to overcome such limitations and enable instantaneous navigation in the scene. Also the guidance for user knowing where (which directions) he/she should go would be of great interest.

However, at present, it is not possible to interactively engage with the user and read his/her intent, such that he/she is transported to the exact place where he/she wants to go or he/she is guided (by some arrows pointing to directions he/she may want to go in the virtual scene).

Existing technologies for visual navigation such as HTML, menus and icons are developed for 2D scenes and documents. They cannot be straightforwardly applied for 3D scenes in virtual reality.

For 3D navigation, computer games have developed an extensive vocabulary of user navigation (controls), that is context dependent and particular to the rules of the game. Users typically spend a significant amount of time for understanding these controls and mastering these navigational skills. Thus, these controls cannot be used for arbitrary 3D scenes which are new and unknown to the user.

In U.S. Pat. No. 9,392,212 B1, a system is configured to present primary and secondary, tertiary, etc. virtual reality (VR) content to a user. Responsive to the user turning his view away from the primary VR content, a sensory cue is provided to the user that indicates to the user that his view is no longer directed towards the primary VR content.

Though enabling enhanced flexibility by providing the presence and user identification of multiple complementary VR sub-scenes in a virtual 3D scene, that technology leaves a substantial degree of complexity in the user navigation in a 3D scene.

Therefore there is a need for a new solution enhancing user experience in virtual 3D scene, in particular to: facilitate user's navigation in the environment; and/or fostering user's perception of the environment.

3. SUMMARY

A particular aspect of the present disclosure relates to a 3D immersive method for a user in a virtual 3D scene including:
- determining a position and an orientation of the user in the virtual 3D scene;
- executing in the virtual 3D scene, for the user, at least one action in function of the position and orientation of the user with respect to the given place; and
- outputting a result of the action(s) to the attention of the user.

According to the disclosure, the method comprises:
- for at least one event in the virtual 3D scene consisting in a presence of at least one determined virtual content, obtaining metadata linking the event(s) and at least one place of the event(s) in the virtual 3D scene;
- determining a given event and the given place linked by the metadata, in function of the position and orientation of the user with respect to the given place and of a relationship between the given event and a user profile of the user;
- executing in the virtual 3D scene, for the user, the action(s) regarding the determined given event and the determined given place.

The general principle of the proposed solution is to enhance user experience in a virtual 3D scene based on metadata about the scene. The proposed solution modifies the classic rendering pipeline for virtual reality using scene specific metadata. More precisely, the metadata allow the selection of a given event and its associated given place is function of several combined criteria: user position and user orientation (i.e. user pose) in the virtual 3D scene and user profile. This is the execution of at least one action in the virtual 3D scene, for the selected given event and its associated given place, which allows to enhance the user experience in the virtual 3D scene (in particular, as described below, enhanced navigation and/or enhanced relighting).

The virtual 3D scene covers advantageously the full user environment, in which case the surrounding world is entirely virtual. In variants, the virtual 3D scene is overlaid over a view of a real-world environment. This corresponds to augmented reality (AR), or to mixed reality (MR) when the real-world environment interacts with computer-generated contents so that digital and physical realities seamlessly blend together.

According to a particular feature, said obtaining metadata includes:
- generating automatically and dynamically said metadata by at least one processor; and
- storing said metadata into at least one metadata storage space.

Thus, two types of metadata can be used: dynamically generated metadata and previously generated metadata. In the case of a prior generation, the metadata are generated either automatically (e.g. by an algorithm) or manually (e.g. by a producer when creating the virtual 3D scene).

According to a particular feature, said executing of at least one action includes:
- determining said given place in a neighborhood of said user in which said given event occurs; and generating communication information to be provided to said user about said given event and said given place.

Thus the proposed solution allows to enhance the navigation of the user in the virtual 3D scene. E.g. the metadata are used to identify specific 3D scene locations and viewpoints to direct the user's attention to these places. The user can quickly navigate in the virtual scene without having to rely entirely on the mechanics of the virtual controls (which are typically developed in an independent manner from the 3D scene). The communication information provided to the user (e.g. a GUI—Graphical User Interface—having a panel to show navigation, or arrows pointing to where the user should move) allows to guide him, so that he moves progressively to the object of interest.

According to a particular feature, said executing of at least one action includes:
determining said given place in a neighborhood of said user in which said given event occurs; and
relighting said given place.

The term "relighting" advantageously refers to working on a visual representation (e.g. an image, a place, a VR scene) to change its illumination.

Thus, the proposed solution allows to enhance the relighting of the virtual 3D scene. E.g. the metadata are used to modify the lighting of the 3D scene, e.g. altering the lighting on places and/or individual objects, to direct the user's attention to these places and/or objects.

According to a particular feature, said relighting is adapted to illuminating favorably said given event.

According to a particular feature, said executing of at least one action includes:
determining said given place in a neighborhood of said user in which said given event occurs; and
relighting an environment of a location of said user so as to guide said user to said given place.

Thus, the proposed solution allows to enhance the navigation of the user in the virtual 3D scene. The user can quickly navigate in the virtual scene without having to rely entirely on the mechanics of the virtual controls.

According to a particular feature, said neighborhood is determined by a maximum distance of said given place from said user.

Thus, the neighborhood is easy to compute.

According to a particular feature, said at least one event comprises at least one among a presence of a person, a presence of an animal, a presence of an object, a presence of a source of a type of sound, and a presence of an activity.

This list is not exhaustive.

According to a particular feature, said executing of at least one action includes:
generating a message presentation to the attention of the user for an optional execution of a further action by said user; and
outputting said message presentation to the attention of said user.

Thus, the user can decide which further action(s) should be carried out to enhance his experience in the virtual 3D scene.

According to a particular feature, said further action includes being teleported to said given place.

Thus, the further action allows to enhance the navigation of the user in the virtual 3D scene. Teleportation allows him to quickly navigate in the virtual scene without having to rely entirely on the mechanics of the virtual controls.

According to a particular feature, said further action includes triggering a relighting of said given place.

Thus, the further action allows to enhance the relighting of the virtual 3D scene.

According to a particular feature, said metadata are encoded together with encoded representations of said virtual 3D scene.

In other words, the virtual 3D scene is encoded inherently with the meta-data, so as to make the execution of the action(s) easy and efficient.

Another aspect of the present disclosure relates to a computer program product comprising program code instructions for implementing the above-mentioned method for managing staggercast transmissions (in any of its different embodiments) when said program is executed on a computer or a processor.

Another aspect of the present disclosure relates to a non-transitory computer-readable carrier medium, storing the aforesaid computer program product.

Another aspect of the present disclosure relates to a 3D immersive device comprising a computation machine configured to:
determine a position and an orientation of a user in the virtual 3D scene;
execute in said virtual 3D scene, for the user, at least one action in function of the position and orientation of the user with respect to a given place; and
output a result of said at least one action to the attention of said user.

According to the disclosure, the computation machine is further configured to:
for at least one event in the virtual 3D scene consisting in a presence of at least one determined virtual content, obtain metadata linking the event(s) and at least one place of the event(s) in the virtual 3D scene;
determine a given event and the given place linked by the metadata, in function of the position and orientation of the user with respect to the given place and of a relationship between the given event and a user profile of the user;
execute in the virtual 3D scene, for the user, the action(s) regarding the determined given event and the determined given place.

According to a particular feature of the 3D immersive device, said computation machine is further configured to execute a 3D immersive method compliant with any of the above-mentioned embodiments.

4. LIST OF FIGURES

Figure 2:
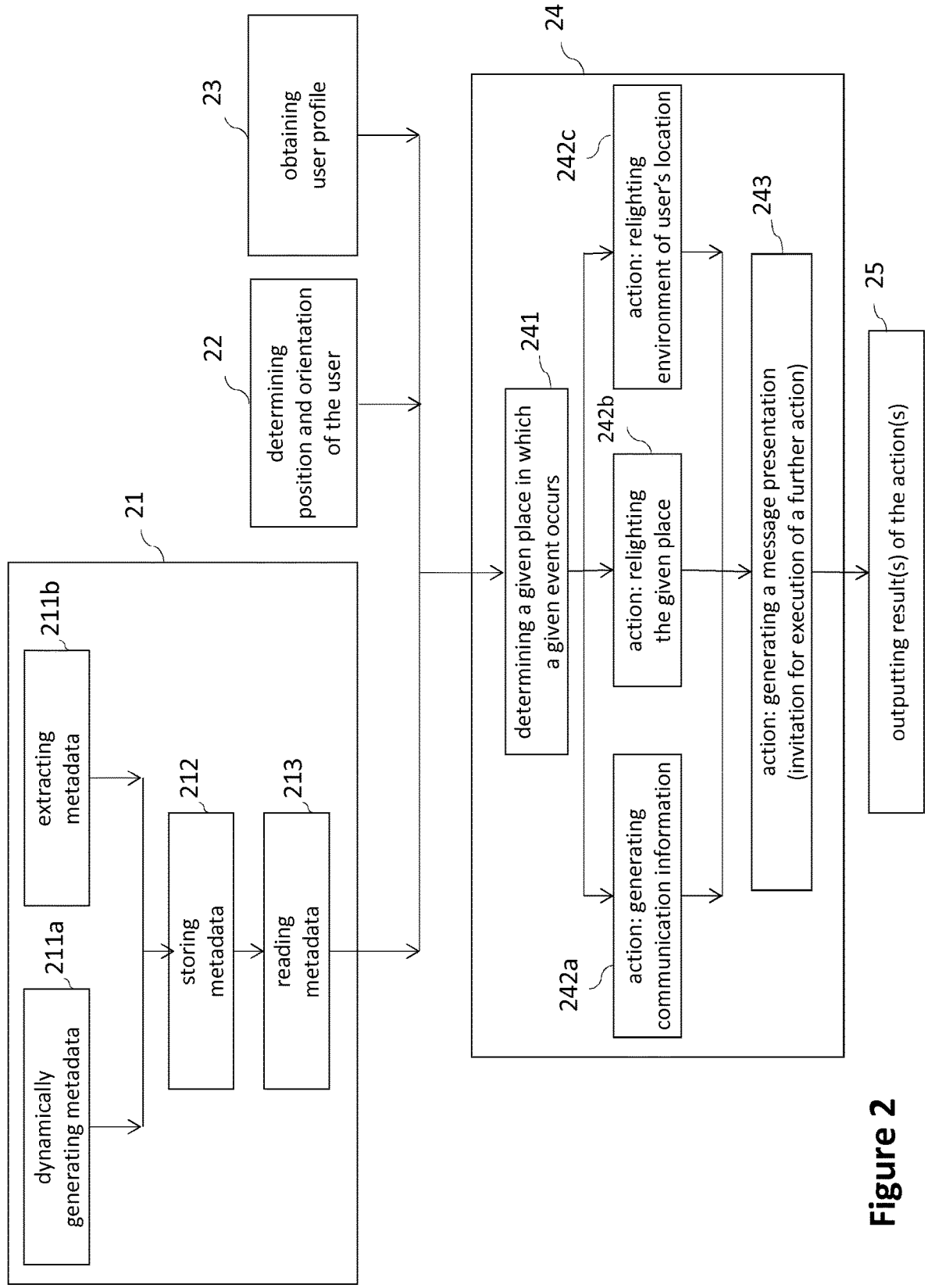

Other features and advantages of embodiments shall appear from the following description, given by way of indicative and non-exhaustive examples and from the appended drawings, of which:

FIG. 1 shows the simplified structure of a 3D immersive device according to a particular embodiment; and FIG. 2 is a flowchart of a particular embodiment of the proposed 3D immersive method.

5. DETAILED DESCRIPTION

FIG. 1 shows the simplified structure of a 3D immersive device 10 according to a particular embodiment. The device 10 comprises a non-volatile memory 13 (e.g. a read-only memory (ROM) or a hard disk), a volatile memory 11 (e.g. a random access memory or RAM) and a processor (computation machine) 12. The processor 12 is also connected to a metadata storage space 14 and a user profile storage space 15. The non-volatile memory 13 is a non-transitory computer-readable carrier medium. It stores executable program code instructions 130, which are executed by the processor 12 in order to enable implementation of the method described below (see FIG. 1). Upon initialization, the program code instructions 130 are transferred from the non-volatile memory 13 to the volatile memory 11 so as to be executed by the processor 12. The volatile memory 11 likewise includes registers for storing the variables and parameters required for this execution. The inputs comprise encoded representations of a 3D scene 16 (e.g. a X3D file) and user pose (i.e. user position and user orientation) 17. The output 18 comprises an enhanced rendering of the virtual 3D scene (e.g. on a head mounted display or any other suitable device, not shown in FIG. 1).

All the steps of the method described below (see FIG. 1) can be implemented by the device 10, equally well:

by the execution of a set of program code instructions executed by a reprogrammable computing machine such as a PC type apparatus, a DSP (digital signal processor) or a microcontroller. This set of program code instructions can be stored in a non-transitory computer-readable carrier medium that is detachable (for example a floppy disk, a CD-ROM or a DVD-ROM) or non-detachable; or by a dedicated computing machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it can also be implemented in hardware form or any form combining a hardware portion and a software portion.

FIG. 2 is a flowchart of a particular embodiment of the proposed 3D immersive method. This method is carried out by the 3D immersive device 10, for a user in a virtual 3D scene.

In step 21, for at least one event in the virtual 3D scene, the 3D immersive device obtains metadata linking this event and at least one place of this event in the virtual 3D scene.

In a first implementation, step 21 comprises:

in a sub-step 211a, the processor 12 generates automatically and dynamically (i.e. during the user's navigation in the scene) the metadata;

in a sub-step 212, the processor 12 stores the metadata in the metadata storage space 14; and in a sub-step 213, the processor 12 reads the metadata in the metadata storage space 14.

In a second implementation (which can be combined with the first one), in a sub-step 211b, the processor 12 extracts (i.e. reads) metadata which have previously been generated and encoded together with the encoded representations of the 3D scene 16 (e.g. X3D file). In the case of a prior generation, the metadata are generated either automatically (e.g. by an automatic algorithm) or manually (e.g. by a producer when creating the virtual 3D scene). Then aforesaid sub-steps 212 and 213 are executed.

Many different types of events may be considered, e.g. a presence of a person, a presence of an animal, a presence of an object, a presence of a source of a type of sound, a presence of an activity, etc.

We present now a non-exhaustive list of possible types of metadata:

metadata relating to a location of a person in the scene: this type of metadata is for example generated by a face detection algorithm in a stereographic panorama, if the virtual 3D scene rendering is captured from the real world. In the case of a synthetic scene, the position of the person can be input in the scene graph by the creator of the virtual scene.

metadata relating to a location of a sound source in the scene: this type of metadata is for example generated by an audio source separation and localization algorithm;

metadata relating to a location of an interesting activity in the scene: in a real world scene captured for virtual reality, this type of metadata is for example generated by running a computer vision algorithm for visual saliency. In a synthetic 3D scene, the location of the interesting activity can be input by the modeling artist, with respect to the action in the scene;

metadata relating to a location of an object (e.g. a tennis ball): the virtual scene can permit different types of 3D interaction with virtual objects. For example, a virtual tennis game might enable the user to hit the ball. In this context, the event is the presence of the tennis ball (object). The metadata links this event and the place of this event in the virtual 3D scene (i.e. the location, generated by an algorithm, where the ball hits the ground). The actions executed regarding this metadata can be (a) generating a message presentation to the attention of the user for an execution of a teleportation of the user to the location where he can hit the ball (this location can be predicted by an algorithm with respect to the location where the ball hits the ground), and (b) relighting (i.e. altering the scene lighting) such that the user can clearly see the ball before he tries hitting it.

In step 22, the 3D immersive device determines a position and an orientation of the user in the virtual 3D scene.

In step 23, the 3D immersive device obtains a user profile of the user (stored in the user profile storage space 15).

For example, the user profile contains at least one attribute showing the user's passions or hobbies. E.g. if the user profile shows that the user loves animals a lot (e.g. he/she posted many pictures about animal in the social networks, or he/she describes himself as loving animal in his/her profile in a webpage), then a location in 3D scene containing images of animals should be recommended for him/her.

In another example, the user profile contains at least one attribute about objects the user is looking for in the virtual 3D scene (e.g. a map or a chest).

In another example, the user profile contains information about the history of the user's views. E.g. if the user has already seen a waterfall before in another scene, we may want to recommend him another thing to see at current scene, even though another waterfall also exists in the current scene.

These examples are not limitative and many other types of attributes can be used to define the user profile.

In step 24, the 3D immersive device executes in the virtual 3D scene, for the user, one or several actions regarding a given event and a given place linked by the metadata (stored in the metadata storage space 14), in function of the position and orientation of the user with respect to this given place, and of a relationship between this given event and the user profile of the user.

We describe now a particular implementation of step 24, comprising sub-steps 241, 242a, 242b, 242c and 243, each corresponding to a different action.

In sub-step 241, the processor 12 determines the given place (in a neighborhood of the user in the virtual 3D scene) in which the given event occurs. In a particular embodiment, the neighborhood is determined by a maximum distance from the user to the given place.

In sub-step 242a (first action), the processor 12 generates communication information to be provided to the user about the given event and the given place. In order to guide the user to move progressively to the object of interest, the communication information is for example provided by a GUI having a navigation panel at the bottom of the virtual 3D scene, or arrows pointing to where the user should move. In other words, that action consists in providing indications for navigating (progressive displacement) to particular identified locations in which specific target matters (such as persons, sounds, objects or activities) are present.

In sub-step 242b (second action), the processor 12 carries out a relighting of the given place. In a particular implementation, the relighting is adapted to illuminating favorably the given event. In other words, this action consists in relighting target object(s) in the neighborhood of the user so as the user better experiences the viewing content. The metadata contain a list of optimal lighting conditions for the given event. In the aforesaid case of metadata relating to a location of a person in the scene, the enhanced relighting alter the global scene lighting such that the facial features of the person are clearly visible to the user. In the aforesaid case of metadata relating to a location of a sound source in the scene, the enhanced relighting is such that when the user turns his eye (virtual camera) towards where the sound source is localized, controls for altering the scene lighting that suit to this specific object can be presented to the user.

In sub-step 242c (third action), the processor 12 carries out a relighting of an environment of a location of the user (preferably modifying globally the lighting around the user in a consistent way), so as to guide the user to the given place.

In sub-step 243 (fourth action), the processor 12 generates a message presentation to the attention of the user for an optional execution of a further action by the user. In a particular implementation, the further action includes being teleported to the given place. In an alternative implementation, the further action includes triggering a relighting of the given place (e.g. if sub-step 242b has not been carried out).

For example, the user's controls for the immersive head gear (whether taking 3D head orientation, or touch based controls on the hand, or controls driven by motion capture of the user's limbs) are used to activate the execution of the further action. For example, the user confirms the teleporting by pressing a virtual button using the aforementioned controls. In the aforesaid case of metadata relating to a location of a person in the scene, the user is teleported in the virtual 3D scene directly to be facing this person.

In an embodiment, a selection of metadata based controls are presented at the bottom of the virtual scene. The user's 3D head orientation (that can be estimated using a camera based sensor) is used to scroll between the different locations (items, buttons) listed at the bottom of the screen. In a different embodiment, hand gestures on a touch based interface are used to scroll between the different listed items. In yet another embodiment, these controls are presented using a point and click mouse device, or a mouse with a scroll wheel mechanism. For example, the items corresponding to the various teleporting locations are spatially ordered with respect to where in the scene they are present with respect to the user's current location, and they are projected to the ground plane in front of the user's virtual camera.

In order to have a seamless experience in virtual 3D scene navigation, the teleporting can be implemented as a rapid user movement in the virtual scene. This can be done by simulating the user motion from the current location to the new teleported location in a computer graphics pipeline, and rendering this simulation as a quick visual snippet, before the user is allowed access to the new set of controls in the new virtual location. This visual snippet may also be enhanced by simulation of motion blur, that achieves a more realistic rendering as the user quickly moves from one location to another.

In the aforesaid particular implementation of step 24, several actions are combined. For example, a panel display with an arrow pointing towards the direction of an object of interest is lighted in a pronounced way when the user passes close to it, and additional information is further communicated to the user about the presence of this object of interest.

In alternative implementations of step 24, only one or some of sub-steps 242a, 242b, 242c and 243 is/are carried out.

In step 25, the 3D immersive device outputs result(s) of the action(s) of sub-steps 242a, 242b, 242c and 243 (or one or some of them) to the attention of the user. The results are for example:
- outputting to the attention of the user the communication information generated in sub-step 242a;
- outputting to the attention of the user the relighting generated in sub-step 242b;
- outputting to the attention of the user the relighting generated in sub-step 242c;
- outputting to the attention of the user the message presentation generated in sub-step 243.

We give below more details about possible embodiments for relighting implementation.

Relighting Using Incident Illumination Map

In one embodiment, we describe the global scene lighting using a distant illumination map. We use the Lambertian reflection model and render the object by multiplying this incoming illumination with the scalar reflectance (albedo value) and the cosine of the viewing angle towards the surface normal of the object.

More elaborate reflectance models are possible, e.g. Phong assumption for specular objects and general BRDF (Bidirectional Reflectance Distribution Function) models. In all these cases, the incident illumination map, represented as intensity values of pixels on an enclosing cube or a sphere, is part of the rendering equation. In certain embodiments, this illumination map can be re-parameterized using spherical harmonic basis, as spectral coefficients of this illumination map. In other embodiments, this illumination map can be re-parameterized using a different basis, such as spherical wavelets. Any of these different representations can be used to implement the proposed solution.

The modeling artist provides a list of optimal illumination conditions as metadata on the current object. Any of these optimal illumination conditions will be different from the current global illumination based on the scene context. An embodiment of the proposed solution provides the user with controls to quickly alter the scene illumination to match the optimal conditions for the current object. In an embodiment, the global illumination is changed by the user for the entire scene even though the control is optimized for a single object. This provides a seamless visual experience for the user and does not make the object appear alien to the rest of the scene.

Relighting Using Color Correction

In a different embodiment, accurate reflectance models of the objects in the scene are not known. This is typically the case for VR (Virtual Reality) scenes captured from the real world. In such situations, lighting based effects can be simulated using color correction methods based on pixel values of color on the object. There are many types of color correction methods. In one embodiment, the RGB (Red Green Blue) values are independently warped using a non-linear transform that is provided by the artist. In a different embodiment, the RGB color is transferred to a different color space and a warping transformation is applied in this new space, before bringing back the colors to the RGB space. In an embodiment, such object-specific color transformations are provided by the artist as metadata over the object. In an embodiment, the color transformation is applied to the entire scene, even though it is optimized to a specific object that is chosen by the user.

Visual Transition in Relighting

In order to have a seamless experience in virtual scene navigation, the relighting can be implemented as a gradual transition from the current lighting to the chosen optimal lighting. This can be done by simulating the path of lighting transition using the computer graphics pipeline, and rendering this simulation as a quick visual snippet, before the user is allowed access to the other controls in the VR scene—whether for navigating the scene or interacting with the objects.

The invention claimed is:

1. A method for a user in a virtual 3D scene comprising:
    obtaining a user profile comprising a relationship between the user and objects or events of the virtual 3D scene;
    generating metadata linking a first location in the virtual 3D scene and an event or an object of the 3D scene at the first location;
    determining a position and an orientation of the user in the virtual 3D scene;
    executing at least one action in the virtual 3D scene to navigate the user to the first location, the at least one action being determined as a function:
    of the first location and the position and the orientation of the user, and
    of a relationship in the user profile between the user and the event or the object of the 3D scene at the first location; and
    displaying a result of the at least one action to the attention of the user.

2. The method according to claim 1, wherein the executing of at least one action comprises:
    generating communication information to be provided to the user about the event or the object and the first location.

3. The method according to claim 1, wherein the executing of at least one action comprises:
    relighting the first location.

4. The method according to claim 3, wherein the relighting is adapted to illuminating favorably the event or the object at the first location.

5. The method of claim 3, wherein relighting the first location comprises rendering the object at the first location using intensity values of pixels on the object.

6. The method of claim 3, wherein relighting the first location comprises transforming pixel color values of the object in the first location.

7. The method of claim 3, wherein relighting the first location comprises rendering a visual transition.

8. The method according to claim 1, wherein the executing of at least one action comprises:
    relighting the position to navigate the user to the first location.

9. The method according to claim 1, wherein the event or the object at the first location is a person, an animal, an object, a source of a type of sound, and or an activity.

10. The method according to claim 1, wherein the executing of the at least one action comprises:
    displaying a message presentation to the attention of the user for an optional execution of a further action by the user.

11. The method according to claim 10, wherein the further action comprises teleporting the user to the first location or rendering a rapid movement of the user from the second location to the first location within the virtual 3D scene.

12. The method according to claim 10, wherein the further action comprises triggering a relighting of the first location.

13. The method according to claim 1, wherein the metadata are encoded together with an encoded representation of the virtual 3D scene.

14. The method of claim 1, wherein the displayed result comprises directional indications to guide the user to the first location and/or navigation guidance to a new position or a new orientation.

15. The method of claim 1, wherein the relationship between the user and objects or events indicates a passion of the user, a hobby of the user, a social networking habit of the user, an object the user is looking for, or a history of objects the user has previously seen.

16. A non-transitory computer-readable medium storing instructions operative, when executed by a processor, to:
    obtain a user profile comprising a relationship between a user and objects or events of the virtual 3D scene;
    generate metadata linking a first location in the virtual 3D scene and an event or an object of the 3D scene at the first location;
    determine a position and an orientation of the user in the virtual 3D scene;
    execute at least one action in the virtual 3D scene to navigate the user to the first location, the at least one action being determined as a function:
    of the first location and the position and the orientation of the user, and
    of a relationship in the user profile between the user and the event or the object of the 3D scene at the first location; and
    display a result of the at least one action to the attention of the user.

17. A device comprising:
    a processor; and
    a non-transitory computer-readable medium storing instructions operative, when executed by the processor, to:
    obtain a user profile comprising a relationship between a user and objects or events of the virtual 3D scene;
    generate metadata linking a first location in the virtual 3D scene and an event or an object of the 3D scene at the first location;
    determine a position and an orientation of the user in the virtual 3D scene;
    execute at least one action in the virtual 3D scene, to navigate the user to the first location, the at least one action being determined as a function:
    of the first location and the position and the orientation of the user, and
    of a relationship in the user profile between the user and the event or the object of the 3D scene at the first location;
    display a result of the at least one action to the attention of the user.

* * * * *

UNITED STATES PATENT AND TRADEMARK OFFICE
CERTIFICATE OF CORRECTION

PATENT NO. : 11,207,592 B2
APPLICATION NO. : 16/465268
DATED : December 28, 2021
INVENTOR(S) : Kiran Varanasi et al.

It is certified that error appears in the above-identified patent and that said Letters Patent is hereby corrected as shown below:

In the Claims

At Column 9, Line 66, Claim 9, delete "and or" and insert --or--.

Signed and Sealed this
Twenty-sixth Day of December, 2023

*Katherine Kelly Vidal*

Katherine Kelly Vidal
*Director of the United States Patent and Trademark Office*